Patented Aug. 5, 1924.

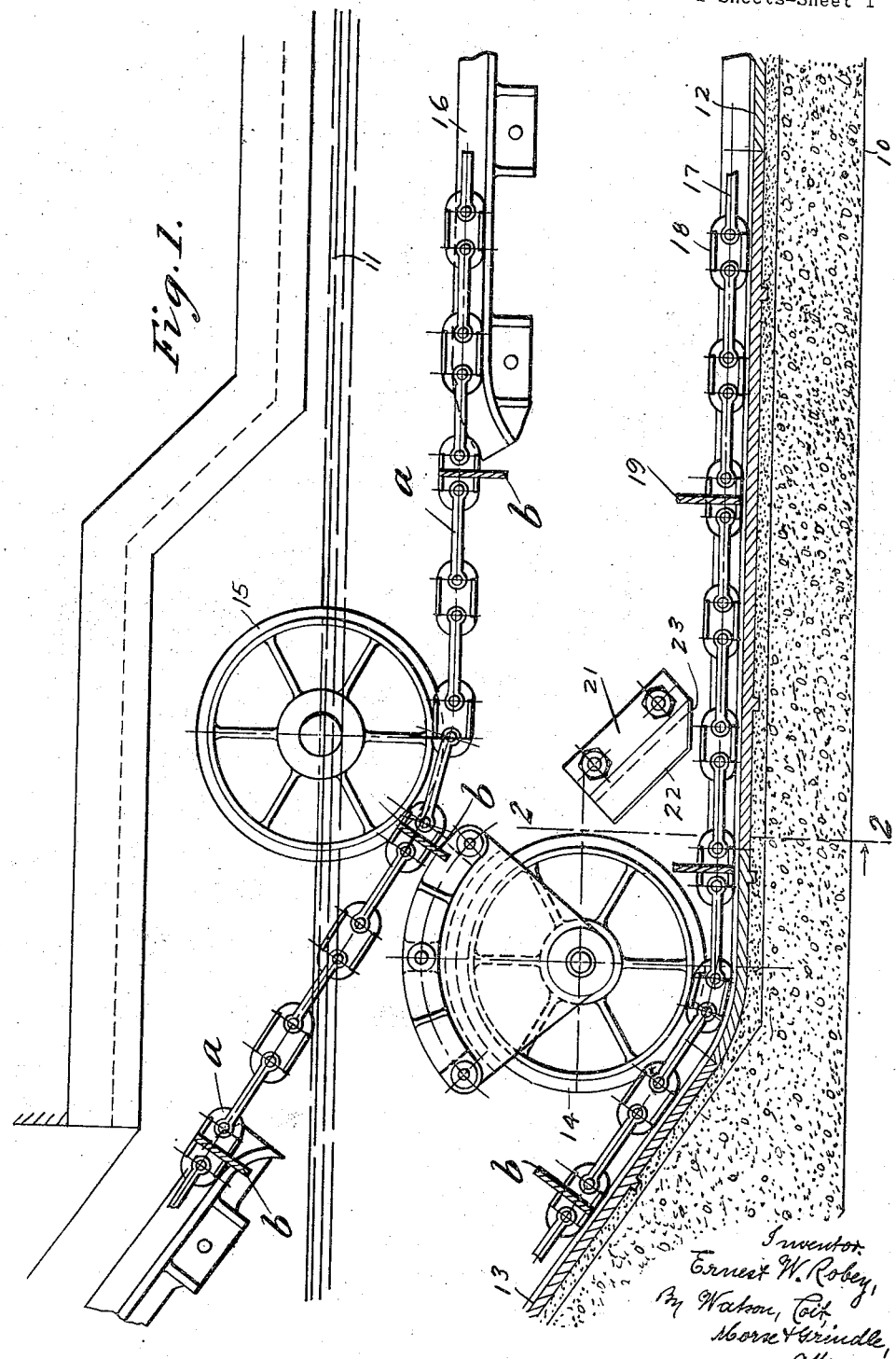

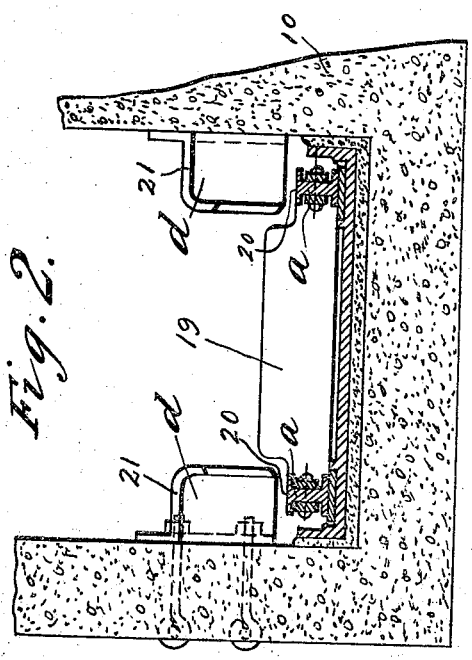

1,503,711

UNITED STATES PATENT OFFICE.

ERNEST WILLIAM ROBEY, OF LONDON, ENGLAND.

ASH CONVEYER COMPRISING CHAINS GUIDED BY SPROCKET WHEELS.

Application filed May 11, 1922. Serial No. 560,139.

*To all whom it may concern:*

Be it known that I, ERNEST WILLIAM RO-BEY, a subject of the King of Great Britain, residing in London, England, have invented certain new and useful Improvements in Ash Conveyers Comprising Chains Guided by Sprocket Wheels, of which the following is a specification.

This invention relates to conveyers, particularly to ash conveyers designed to be operated under water in connection with large furnaces such as in steam power plants. In installations of this character it is common to discharge ashes from the furnace grates through chutes into troughs of water, the water serving to quench any burning coals, but mainly to provide a seal against the entrance of cold air to the furnace stack. It is usual to employ in connection with such discharge chutes, conveyers in the form of endless chains, carrying scrapers which pass over the bottom of the trough and remove the ashes therefrom by scraping them along the bottom and up the inclined ends of the troughs. Means must be provided for holding the conveyer in proximity to the bottom of the trough and this is usually a guide roller for each chain, under which the chain passes, placed at each end of the flat bottom portion of the trough. Due to currents set up in the water and to the specific gravity of the ash, the latter does not always fall straight downward through the water, but large quantities are carried on to the chains and lodge there. This ash is then carried between the rollers and the chains, and on account of its abrasive character, causes rapid wear, both of the chains and guide rollers.

The principal object of this invention is to eliminate this excessive wear by preventing the ashes from being carried between the chains and rollers. Other objects will be apparent from the annexed description and accompanying drawings in which:

Fig. 1 is a longitudinal section of a portion of an ash trough showing the application of my invention to a conveyer; and Fig. 2 is a transverse section of the same, on the line 2—2 of Fig. 1.

The trough 10 is adapted to be filled with water up to the level 11, and has a flat bottom 12 and inclined ends 13 over which a chain conveyer is constrained to travel by guide rollers 14. The conveyer is preferably endless, the upper or return flight being supported above the bottom of the trough by any suitable guides such as 15 and 16. The conveyer preferably comprises two chains, one at each side of the trough, each composed of link members 17 and 18. To some or all of the link members 18 are fastened scraper bars 19, the latter extending between the chains across the width of the trough as shown in Fig. 2. Each scraper extends above the chain, but a portion of each end is cut away flush with the edges of the links as shown at 20 in Fig. 2, in order to allow the chains to pass over the rollers. Secured to the sides of the trough in any suitable manner are plates 21 which extend over and in close proximity to the chains. As shown in Fig. 1 both the longitudinal edge 22 and the transverse edge 23 of the plate are at an angle to the chain, the purpose being to deflect any material which is falling through the water near the rollers away from the rollers and to carry toward the center of the trough all material lodged on the chains.

As the lower flight of the conveyer travels to the left as seen in Fig. 1, the plates 21 will remove the ashes therefrom and thus prevent abrasion and eliminate excessive wear.

It will be understood that the invention is not limited to the particular details of construction or arrangement which have been shown for the sake of illustration, but includes such modifications as fall within the scope of the appended claims.

Having thus described the invention what is claimed as new and desired to be secured by Letters Patent is:

1. A device of the character described in combination a liquid trough, a conveyer for abrasive material comprising a chain movable in the trough beneath the surface of the liquid, a guide roller for the chain disposed above and in contact with the chain and means adjacent the roller and projecting in proximity to the chain for removing material from the chain whereby the material is prevented from passing between the roller and the chain.

2. In a device of the class described in combination a liquid trough, a conveyer for abrasive material comprising a chain movable in the trough beneath the surface of the liquid, a guide roller for the chain disposed above and in contact with the chain and a scraper plate disposed above the chain and adjacent the roller the transverse edges of said plate being inclined to the chain to remove material therefrom and deflect it to one side of the chain.

3. In a device of the class described in combination a liquid trough, a conveyer for abrasive material comprising a chain movable in the trough beneath the surface of the liquid, a guide roller for the chain disposed above and in contact with the chain and a scraper plate disposed above the plane and adjacent the roller, both the transverse and longitudinal edges of said plate being inclined to the chain to deflect material away from the roller and the chain.

4. In a device of the class described in combination a liquid trough, a pair of guide rollers at opposite sides of said trough, a conveyer movable in said trough comprising a chain below and in contact with each roller and a plurality of scraper members disposed between and supported by the chains, scraper plates disposed on the sides of the trough above each chain and adjacent said rollers the transverse edges of the scraper plates being inclined toward each other to deflect material from the chains into the path of the scraper members and the longitudinal edges of the scraper plates being at an angle to the chains to deflect material away from the rollers.

In testimony whereof I have signed my name to this specification.

ERNEST WILLIAM ROBEY.